United States Patent [19]

Dolch

[11] 3,852,573

[45] Dec. 3, 1974

[54] ALIGNMENT CORRECTION FOR READ SCAN RASTER FIELDS

[75] Inventor: Volker Dolch, Neu Isenburg, Germany

[73] Assignee: Scanner, Inc., Houston, Tex.

[22] Filed: Nov. 16, 1973

[21] Appl. No.: 416,372

[52] U.S. Cl.... 235/61.11 E, 235/61.12 N, 250/566, 340/146.3 H

[51] Int. Cl.... G06k 7/015, G06k 19/06, G08c 9/06

[58] Field of Search....... 235/61.11 E; 340/146.3 H; 250/555, 566

[56] References Cited

UNITED STATES PATENTS 3,603,728 9/1971 Arimura....................... 340/146.3 H 3,800,282 3/1974 Acker.......................... 235/61.11 E 3,801,775 4/1974 Acker.......................... 235/61.11 E

*Primary Examiner*—Daryl W. Cook

*Attorney, Agent, or Firm*—Ralf H. Siegemund

[57] ABSTRACT

A read raster for a data field is corrected as to alignment by detecting passage of different scanning lines across different portions of the bottom or top boundary of a data marking, only hypothetically delineated by the non-merging tops or bottoms of the markings.

9 Claims, 20 Drawing Figures

ALIGNMENT CORRECTION FOR READ SCAN RASTER FIELDS

BACKGROUND OF THE INVENTION

The present invention relates to reading of contrasting information, and more particularly, to the preparation for reading a data field having contrasting information.

In my copending application, Ser. No. 284,733, filed Aug. 30, 1972, now abandoned in favor of continuing application, Ser. No. 435,358, filed Jan. 21, 1974 I have described a method and system for reading data label which in summary is organized as follows. The data is presented as contrasting markings on a label serving as background; the markings have elongated portions which extend in one direction, and plural markings for defining characters are arranged along an orthogonal direction in one or several tracks. The data field as such is identified by one or several additional line patterns which extend, for example, parallel to the tracks, or parallel to the direction of the markings, or both, and each line pattern consists of several lines of different thickness with, preferably, different distance between the lines. The line pattern or patterns define location, orientation and beginning and end of the data field.

A read process for the data markings is preceded by a search process, wherein equipment looks for the position identifying line pattern in a larger observation and inspection field and then homes-in on the data field on basis of the detected line pattern. The read process is to be carried out without handling the item carrying the label, i.e., without physically orienting and positioning the label in a read position. Rather, the "homing" process includes the setting-up of a local scanning raster on basis of the orientation data gained upon detecting the position identifying line pattern, and the data field proper is then scanned by means of that scanning raster, using scanning lines that run and sweep parallel to the tracks, and precession of the scanning lines orthogonally thereto establishes a raster field. The field scan runs, of course, in the direction of extension of the individual markings.

In practice, it was found advisable to use a data field position identifying line pattern in front of the data proper as that occupies minimum space. Moreover, that line pattern can also serve as a start character for controlling the read process as following the label detection, in such a manner that contrasting information is not recognized as data, until after a scanning line has traversed that pattern. This way, interference in the read process by random contrasts, not pertaining to the data field proper, is minimized.

It was found, however, that such a particular line pattern may not necessarily yield sufficiently accurate information on the orientation of the data field, if the character markings are relatively small. It can readily be seen that tall characters as arranged along a track, can easily be scanned even if a scanning line sweeps not exactly parallel to the track. The smaller the characters, the narrower are the tolerances here as to angular misalignment of raster field and data field.

A similar problem arises if the plane of the data field is not parallel to the plane of the raster, but is tilted. The tracks will appear at an angle different from 90° to the line pattern. A similar situation may occur if position identifying line pattern and data are printed separately on a label; this is actually the usual case. The labels are prepared as such with a position identifying line pattern, and the data characters are then printed thereon individually. These data characters may, for example, by price and/or stock number for items of merchandise to which the labels are affixed. Printing of the data markings may place them somewhat misaligned in relation to the contemplated track direction as implicitely defined by the line orientation of the position identifying line pattern.

SUMMARY OF THE INVENTION

It is an object of the present invention to provide for corrective steps and equipment to adjust the read scan raster of the type outlined above so that the scan lines do transverse the data markings parallel to the actual track extension as defined by the position and orientation of the data markings, even if one or several of the interfering circumstances arise, as outlined above. However, considering the specific circumstances and problems out of which the invention arose, it will be seen that the concepts and principles involved have broader application and can actually be used in all those circumstances in which a read raster is used to read contrasting information, defined as contrasting markings and confined within specific boundaries, parallel to or actually bounding the track or tracks, and wherein the read raster is somewhat misaligned for one reason or another, whereby, however, the assumption can be made that detected contrasts most likely constitute data and are not unwanted random contrasts.

For reasons of facilitating description, the following terminology is to be used. Label area and data field are used interchangeably and define an area which containes data markings defining, for example, characters arranged in one or several rows. Additionally, the data field or label area may contain a position identifying line pattern for reasons outlined above. The term data area will be used to describe that area occupied by a row of characters and bounded immediately and directly by the contrasting markings themselves, their end portions etc. The boundary is presumed to be hypotentical in parts as upper and lower boundaries are established merely by the ends of the vertical extension of the markings of each character, possibly augmented by horizontal line segments which supplement the characters outside of the track space, but which do not merge for adjacent characters. Within his definition, a row of characters occupies directly a particular data area as delineated by such boundaries.

In accordance with the preferred embodiment of the present invention, it is suggested to detect the traversal of scanning lines of upper or lower boundaries of the, or a data area, as containing the markings themselves, if the scanning raster is obliquely positioned in relation to one or both of these boundaries. The relative phase of a boundary traversal by different scanning lines is detected. The principle features of the invention do not refer to the traversal of different scanning lines across a boundary line, an edge or the like, because such a contiguous directional indication would always be put on the label in a separate step and, therefore, cannot be used for the inventive purpose. The features of lhe invention relate specifically to discrimination between passage of a scanning line across label area above the upper or below the lower hypothetical data area boundary as respectively defined by tops or bottoms of the several characters on one hand, and the traversal of the scanning lines of data area space between these boundaries on the other hand, whereby the latter traversal encount data markings but only on incorrect orientation of the raster. The boundary passages as so defined for several scanning lines are then compared and the result is processed to provide for a representation of angular raster field-data-field misalignment which, in turn, is then used to correct the orientation of the read raster.

The principle of the invention is based on the recognition of the fact that a scanning line approaching (or receding from) an area occupied by contrasting data markings, will produce a constant output level during part of its run while contrasting markings will produce signal excursions during other parts of that run. The onset (or end) of the excursions, i.e., the dividing line between uniform signal level and signal portions with excursions, will be different on sequential scanning lines. The phase shift of that dividing line is then used to extract information on the raster misalignment from the data field.

Basically, two approaches in implementing the method are possible. One approach is to count the number of scanning lines between two lines each of which has the said dividing line occurring in different but specified phases or segments of the line. The other approach is to detect, as between two fixedly spaced lines, the relative phase shift of that dividing line (onset or end of signal excursions). Onset or end of signal excursions, however, are not easily defined if, as assumed, the data area boundaries are not delineated by continuous lines but are, as far as physical representation is concerned, defined by the more or less random spacing of the vertical ends of character markings. Therefore, the dividing line is deemed to exist or occur within a specified period if more than one excursion occurs, and that group of excursions is positively preceded or succeeded by absence of such excursion, for a significant length of time within a scanning line.

The detection process, as far as passage across a boundary is concerned, may be a direct or an indirect one. The former is present if excursions themselves are detected in particular timed relation to each other and in relation to the progressing phase of the line scan spot. The indirect method is used by, for example, putting the contrast information of a line scan of or a portion thereof in a register, into different registers for different lines, and extracting an analog equivalent of such digital information by treating the contrast bits, e.g., as binary bits, and their relative phase of occurrence is interpreted as a digit position equivalent. Another indirect method involves attempting to assemble characters, legal or illegal, from plural markings under the assumption that total absence of markings does not even lead to an illegal character. The first or last illegal character is then informative as to the boundary passage of slanted scanning lines.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a typical label 10 of the type to be used for identifying objects to which such a label is affixed. The label 10 shows two rows of characters which are human readable, but each is composed of four vertical bars arranged in six positions per character and along two tracks. The horizontal contrast lines are not of encoding significance as far as machine reading is concerned, but serve to convert the four-bar-line code of each character into a human readable character. These horizontal lines (and the slanted ones of the 7) are outside of the track space.

One can see that the label has altogether four data tracks. Additionally, one can see that each row of characters occupies a certain data area delineated by dotted lines which are not on the label but are hypothetical only. These data areas each have an upper and a lower boundary. These boundaries are partially hypothetical, partially real. Except for the 4, they are established by the lower crossline of each character, and these croslines or transverse lines are all more or less aligned. The 4 just contributes the ends of its vertical markers to the respective boundaries. The boundaries of the data area of each row of characters are hypothetical in that these horizontal top and bottom character lines of adjacent characters do not merge.

Above the upper and below the lower boundary of each data area is a white space, i.e., there is space not occupied by data markings. To the left of the two data rows and areas is provided a position identification and start alignment character (or PISAC for short). This character is established by three vertical lines spaced differently in the horizontal and two being thinner than the middle one. The lines are longer than the vertical distance between the upper boundary of the upper character row and data area, and the lower boundary of the lower data row and area.

Figures 1, 2, 4:
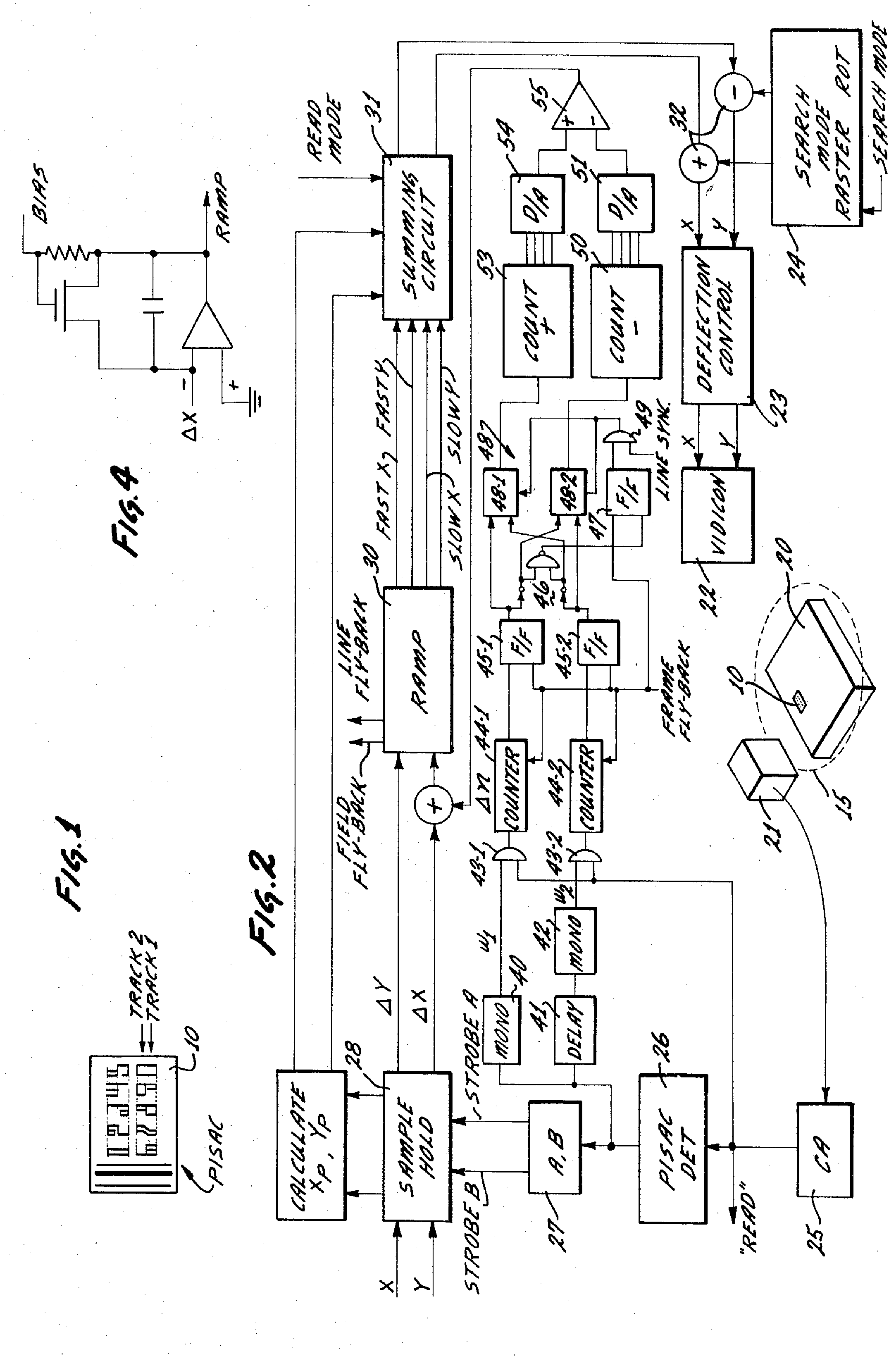
FIG. 1 is an example for data field labels to be read.
FIG. 2 is a read raster establishing and correcting circuit, shown in block diagram.
FIG. 4 is a circuit detail for FIG. 2.

A label of the type shown in FIG. 1, i.e., a label with such a PISAC and two parallel rows of five characters each may be used to identify an item to which the label is affixed. (The characters may define price and stock number). For purposes of data acquisition, such as price tallying of plural items, taking of inventory or the like, the label has to be read. Equipment for that purpose, including particularly novel features of this invention, is shown in FIG. 2. For purposes of incorporation by reference, I shall refer repeatedly to my copending application, Ser. No. 284,733 filed Aug. 30, 1972, showing several details which will find direct utility in the present application.

An item of merchandise, such as 20, may appear at random times and in random orientation in an inspection and search field 15 which is under surveillance of a photoelectric detector 21. The area 16 is raster scanned by a vidicon 22 or flying spot scanner, the former being preferred. The vidicon 22 is under control of a deflection control circuit 23 providing deflection signals for the vidicon. These deflection signals are also termed $x$ and $y$ signals on basis of the two orthogonal deflector systems of the vidicon. It is pointed out, however, that the $x/y$ system of the deflector coils or of electrodes in the vidicon bear normally no relation to the orientation of a label 10 as it may appear in the combined range of the vidicon scanner and of the detector 21.

The $x$ and $y$ inputs of the control 23 (basically a set of amplifiers) receive normally ramp signals as derived from a raster rotation circuit 24. Reference is made here to FIG. 3 of my copending application, Ser. No. 284,733 as to details. As a consequence, scanning rasters are produced, one at a time, and differing by the orientation of the scanning lines. During the search mode, numerous contrast signals will be picked-up by the detector 21, having no significance, unless a label such as 10, is in the search field. However, in order to find the label, the search raster must have orientation so that the scanning lines traverse the PISAC at not too shallow an angle. In such a case, such a traversal will produce a unique bit pattern, and repeated detection of that pattern in sequential scanning lines is an indication that the location of a label has been found.

The video output signal of detector 21 is applied to a so-called contrast automatic 25 (or CA-25 for short) which improves the wave form of the signal (see my copending application, Ser. No. 299,060, filed Oct. 19, 1972). The more or less rectangular wave train furnished by the CA-25 is applied to a PISAC detector 26 of the type shown in greater detail in FIG. 5 of my application Ser. No. 284,733, output of 361 therein. The circuit 26 provides an output strobe each time a PISAC has been detected, which occurs, for example, at a time a scanning line has arrived at a point A in FIG. 3*a*, or in any point vertically aligned in FIG. 3 with point A, such as point B.

A circuit 27 detects two specific points A and B on the PISAC, or more specifically, circuit 27 provides strobe signals at a time scanning lines pass respectively points A and B on the PISAC. Specifically, a point A signal is produced after several scanning lines have passed across PISAC, and a point B signal is produced if a specified period thereafter several scanning lines have also passed across PISAC.

Sample-and-hold circuits 28 receive continuously the $x$ and $y$ raster scan signals are provided by circuit 24 and, therefor, "knows" where the line scan spot is in each instant. Circuit 28 responds also to the A and B strobe signal from circuit 27 and samples and holds the $x$ and $y$ deflection signals for defining the position of points A and B in the scanning field. These signals can be termed $x_A$, $y_A$ for point A and $x_B$, $y_B$ for point B, and they define these points in terms of x and y vidicon scanning beam deflection amplitudes, independently from the raster orientation during which they originated. Circuits equivalent to circuits 27 and 28 are shown in detail in FIG. 5 of my copending application, Ser. No. 284,733.

Circuit 28 generally includes additionally means for calculating two signals $\Delta x$ and $\Delta y$, which, as far as the $x$-$y$ vidicon deflection circuit is concerned, define the direction of orientation of the PISAC, in terms of orientation of PISAC relative to the deflection system in the vidicon; $\Delta x = x_B - x_A$, $\Delta y = y_B - y_A$, see FIG. 3*b*. In addition, circuit 29 is provided to calculate the coordinates of a point P which is to serve as the starting or "anchor" point of a read raster. That point P may have a definite relation to points A and B and its coordinates are algebraically calculated therefrom.

The signals $\Delta x$ and $\Delta y$ are fed to a set of ramp generators 30 which provide a line scan signal orthogonally to the PISAC lines, and a field scan signal for field or raster scanning in the direction of the PISAC lines. The line scan signal will be composed of two fast ramps, one being proportional in slope to $\Delta y$ which is fed to the $x$ deflector system, the other one is proportional in slope to $\Delta x$ which is fed to the $y$ deflector system. Consequently, circuit 30 has two ramp generators, one having $\Delta x$ as input, the other one having $\Delta y$ as input.

One uses here, for example, operational amplifiers with capacitive feedback and retrace proportional to the input. One of the ramp generators is shown representatively in FIG. 4; they are all similarly designed. The generator includes an operational amplifier with capacitive feedback and a FET for retrace control when a particular amplitude has been reached. Slope and peak amplitude of that ramp are proportional to the input, e.g. $\Delta x$ as applied.

The ramp generators 30 include another pair of ramp generators operating at a slower rate for obtaining the field scan. Again, one slow ramp is proportional in slope to $\Delta y$ which ramp signal is to be fed to the y deflector system; the other ramp signal is proportional in slope to $-\Delta x$ and is to be fed to the $x$ deflector system.

The two ramp signals, one fast, one slow, for the $x$ deflector system are combined in a circuit 31, so are the two ramp signals, one fast, one slow, for the $y$ deflector system, and in combination a read raster is produced that spans the area of the data field. In other words, circuit 31 combines the two ramp signals destined for controlling $x$ deflection and combines separately the two ramp signals destined for controlling $y$ deflection. The resulting read raster is obliquely oriented depending on $\Delta x$ and $\Delta y$ as used to calculate its orientation.

Figure 3A:
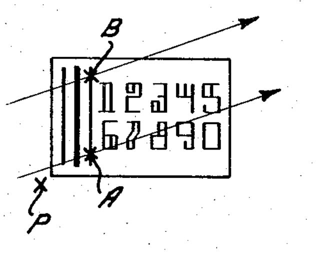
FIGS. 3*a*, 3*b* and 3*c* show the gradual development of read raster.
Figure 3B:
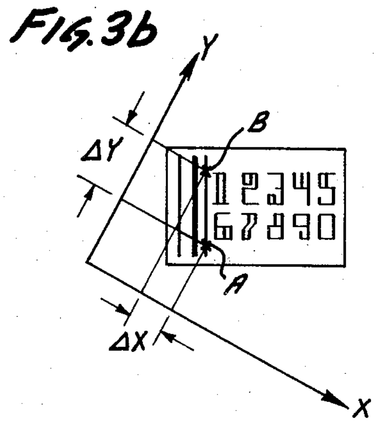
Figure 3C:
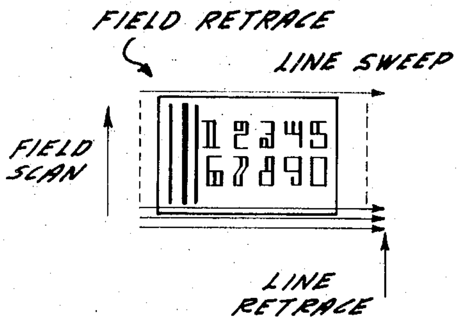

This read raster is to be located as a whole by the signals for point P which defines the origin of the read raster (FIG. 3*c*). On the other hand, the ramps begin with zero output in each instance. Thus, circuit 31 adds to the ramp signals for the $x$ deflection system, the coordinate $x_p$, and $y'_p$ is added to the ramp signals for the $y$ deflection system to properly lodge the origin of the read raster to point P. That point may be slightly outside of the data field, it should definitely be on the other side of PISAC and below the lowest data row.

As only indirectly indicated in the drawing, but apparant from the foregoing description, search operation and read raster production are sequential steps. The search mode is terminated on finding points A and B, whereupon the read mode begins. This means that circuit 24 is disabled or disconnected from deflection circuit 23 and the $x$-$y$ input channels of that circuit 31 instead. Summing points 32 could be modegated to serve as signal switches for the two different modes.

Figure 3D:
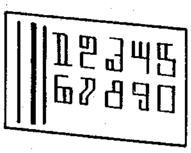
FIGS. 3*d*, and 3*e* show situations in which the normal read raster generation leads to misalignment.
Figure 3E:
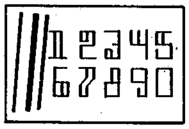

It is apparent that the situation depicted in FIG. 3c represents the ideal case wherein the lines of the scanning raster run at a 90° angle to the PISAC lines, and traverse the four data tracks strictly colinear therewith and parallel to the boundaries. FIG. 3d and 3e represent situations in which this is no longer true. FIG. 3d represents a label as seen by the scanner-detector system when the label is tilted diagonally to the scanning plane. FIG. 3e represents a label in which the data were printed at a skew to the normal on the prepared PISAC lines. In either case, a scanning raster oriented at right angles to the PISAC lines will not have scanning lines that traverse the data in track and data row parallel relation. The circuit to be described next corrects the read raster so as to deviate from the orientation to the PISAC lines and homes-in the read raster orientation to run strictly parallel to the data rows and tracks.

The portion of the circuit of FIG. 2 to be described next provides read raster correction on the basis of a principle understood best from FIG. 5. If the scanning raster is obliquely oriented, it is inevitable that, for example, a scanning line such as $l_o$ after having traversed the PISAC, passes white space underneath the lower boundary of the data row, but scanning line $l_o$ traverses, also, some of the markings that make up the last character towards the end of the data area. The particular markings so traversed are in this specific example, the horizontal bottom bar of the character 3, and, for example, the large vertical bar of that character. Another line, such as $l_p$, and occurring later if the raster field scans up as far as the vertical field scan is concerned, will traverse the horizontal bottom line of the first character and, of course, other markings. As can be seen, that line $l_p$ does not traverse all of the vertical markings in the lower track of that character row because of its skew. Neither line $l_p$ nor line $l_o$ will produce a correct read-out of track 1. However, both scanning lines produce significant information as to the skew of the scan relative to the tracks.

Sequential scanning lines are actually quite closely spaced. Each of the two tracks across the characters of the illustrated configuration can be traversed by six sequential, parallel and juxtaposed lines. The track spaces are indicated in dotted lines to the right of FIG. 5. Under such circumstances, and assuming a data field length of five characters per row, the following rule prevails:

The number of scanning lines between the lowest one of all scanning lines that traverse some contrast portion of, for example, the first two characters, and the lowest line of those which traverse some portion of, e.g., the last two characters, but clear the bottom of all (three) characters ahead, is proportional to the angle of misalignment between the scanning lines and the bottom boundary (or top boundary) of a data area; the boundary direction defining a correct alignment in each instance because they run parallel to the tracks.

The exact numerical relation is, of course, dependent on many factors such as character spacing, number of characters per row etc. Decisive is, however, that, for a given data field format, there is a definite numerical relation between, on one hand, the number of lines between two lines which traverse two well defined spaced-apart sections of the character bottoms, as measured, e.g., from the PISAC, and the angle of misalignment of the raster field. Moreover, that relation is a proportionality between misalignment angle and number of lines, because for small angles the sine and tangent functions are about equal to each other and to the angle itself. The accuracy of that proportionality relation, of course, depends on how well defined these sections are, and how small they can be defined. It was found practical for several reasons to make the definition as follows:

A first section is the section or portion of the bottom boundary of the data area, at and under the first two characters (ending with the third marker or the third marker position of the second character). The second section is the section of the bottom boundary of the data area under the last two characters, ending actually with the last vertical marker position of the last character (each character has three such positions).

A scanning line is deemed as having traversed the first section of the bottom boundary of the data area, if the line traverses two contrasting markings (regardless of whether they are horizontal or vertical) contrast lines in that section and there is no lower line that traverses two markings in that first section. There could be a higher one, but for purposes of defining a single scanning line which passes the first section of the bottom boundary, only the lowest one of those which do is singled out.

Analogously, a line is deemed to have traversed the second bottom section as defined, if it is the lowest scanning line that traverses two or more markings in that section. The determination as to whether a line is the lowest of those that meet the criteria, otherwise comes from the fact that the read raster is deemed to progress in up direction, i.e., the bottom boundary as defined is the leading boundary as far as the field scan direction is concerned. One could establish analogous rules for the top boundary, and here one will always take the respective highest line.

Figure 5:
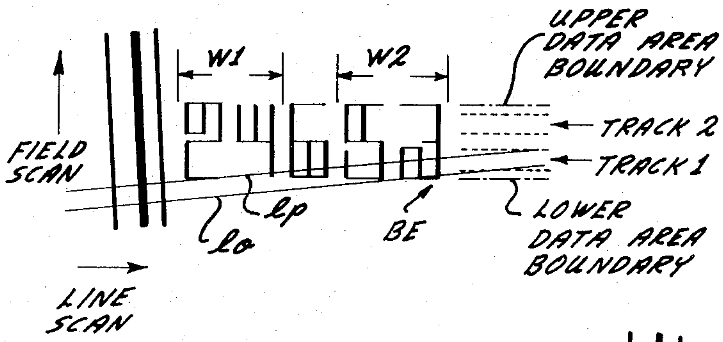
FIGS. 5 and 6 show a data field with different error situations and how they are corrected by operation of the circuit of FIG. 2.

In the specific example illustrated in FIG. 5, $l_o$ is deemed the scanning line which is the lowest one of those that traverse the second bottom section, as that line traverses just the horizontal bottom line of the 3 and the last vertical line, it may pass just across the lower righthand corner of the 3. The scanning line $l_p$ is the lowest one of those which pass the bottom boundary of the data area in the first section as defined, because that line $l_p$ crossed two contract markings before having swept beyond the first two characters.

The number of scanning lines from $l_o$ to $l_p$ or between $l_o$ and $l_p$ is a representation of the misalignment angle between scanning raster data field and track orientation. It makes no difference in principle whether $l_o$ and/or $l_p$ are included in the count, this is merely a matter of resolution. Of course, consistency is required.

One could narrow the width of a section to the width of one character only, but because of the 4 that would necessitate permitting response in case of traversal of one marking only, which is not too desirable because of possible dirt spots which could trigger an unwanted response. This then is the basic feature of distinguishing, along a scanning line, between a uniform level video signal and the onset or end of a train of excursions. The sections define specific phases, comparable among all scanning lines for occurrence of this onset or end.

In order to determine whether under these circumstances a scanning line passes across one or the other section of a data area boundary, the section is correlated with a particular phase in the progressing scanning spot on its run to define a line. That phase is, of course, the same for all lines. Next, it is established whether markers are traversed by the spot when progressing through that phase; additionally, it is established whether or not the scanning spot traversed any markers before or after that phase, and finally it is established whether or not the scanning line below does not traverse markers (or not a required number of markers) when passing through that phase. All this holds true if one uses the lower boundary; however, above should be used as term instead of below when using the upper boundary of a data area.

The detection of the number of lines between a line passing through one bottom section and a line passing through the other bottom section determines the misalignment angle. In addition it must be determined which line comes first so as to distinguish between two different misalignment directions. These two cases are depicted respectively in FIGS. 5 and 6.

Turning now to the implementation, I complete the description of FIG. 2. It will be appreciated that for purposes of the, possibly, necessary correction, the read phase should be divided into a correction phase and into a read phase proper, both using the read raster. Thus, one could term this phase more properly the read raster phase, having a read raster correction phase followed by (or, possibly, overlapping with) a read phase.

In the preceding paragraphs I have mentioned the several lines to be detected under certain conditions in more general terms. For purposes of implementing the read raster correction operation, the first and second sections as defined on the lable must correlate with the scanning process which is a process translating locations into time. The first section as stated is the portion of the lower data area boundary to which pertain the bottoms of the first two characters. In terms of time, a scanning line can traverse that section only during a specified period. The same is true for the second boundary section. Both periods can be related in time to the instant of passage of a scanning line across PISAC.

The first and second sections are defined by way of generating gating windows. A monostable multivibrator 40 is triggered by the PISAC detector 26 for generating a first window. It will be recalled that detector 26 responded in the search phase to the found, PISAC-identified data field; detector 26 continues to operate in the read raster phase and provides a pulse each time a scanning line traverses the PISAC lines. This will occur shortly after the beginning of each scanning line.

The mono-vibrator 40 provides a gating signal or "window" $w1$, having duration beginning with (or shortly thereafter) the time the scanning line passes the PISAC up to a time slightly later than traversal of the scanning line by a distance equal to the time it takes to pass across the first two characters. The same detector 26 pulse triggers a delay 41 having duration equal to a period for scanning across three characters which marks the beginning of the last two characters. The delay 41 triggers another monostable multi-vibrator 42, providing a gating window $w2$ for duration equal to the period needed to scan across the last two characters, but ending after passage, or possible passage, of a scanning line across the last marker or marker position in the data area.

The relative phase of occurrence and duration of signals $w1$ and $w2$ are shown in FIG. 5, and they must be understood in time as covering particular phase sections of any scanning line. In accordance with the basic objective of the circuit, the occurrence and detection of contrast markers during windows $w1$ and $w2$ in relation to any scanning line must be related to absence of such detection and occurrence in the preceding scanning line, to single out a line, such as $l_o$ and $l_p$, and this singling out is the detection process for the lowest line passing the bottoms of the first two characters ($l_p$ - in FIG. 5) and the lowest line passing the bottoms of the last two characters ($l_o$ - in FIG. 5).

If the devices 40, 41 and 42 were triggered by a scanning line below line $l_o$ and which clear the entire data field, nothing will happen during $w1$ or during $w2$. That is to say, no contrast will be detected during the run of the scanning lines below $l_o$ and after having respectively crossed PISAC. The circuit to be described next detects lines $l_o$ and $l_p$ and counts the number of lines between them. Additionally, the circuit distinguishes between the two cases of FIG. 5 and 6.

Figure 6:
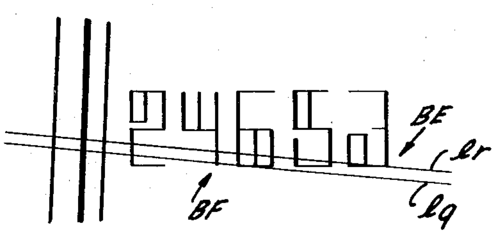

In FIG. 6 the lowest scanning line traversing the bottom of window and section $w_1$ is denoted $l_q$, while the lowest scanning line traversing the bottom of window and section $w_2$ is denoted $l_r$. In FIG. 5, $l_p$ is detected after $l_o$, in FIG. 6 $l_q$ is detected before $l_r$. The gating signals w1 and w2 are applied to a set of gates 43-1 and 43-2 respectively each receiving also the output of contrast automatic 25. The outputs of gates 43-1 and 43-2 are, therefore, contrast and markers identifying signal excursions that occur when windows $w1$ and $w2$, respectively, are open.

The marker signals as occurring during these periods $w1$ and $w2$ are respectively applied to a pair of counters 44-1 and 44-2 to determine whether or not at least two markers have been detected during a scanning line and while window $w1$ or $w2$ was open. If that is the case for $w1$, counter 44-1 will trigger a flip flop 45-1, while counter 44-2 when having counted two markers during window $w2$, will trigger a flip flop 45-2. The two flip flops are reset by the frame or field fly back signal as derivable from the ramp generators 30.

It can readily be seen that flip flop 45-1 will be triggered or set when 2 contrast markers have been detected during window $w_3$, assuming that the immediately preceding (lower) scanning line does not encounter 2 contrast markers during $w_1$. This assumption can be made, because otherwise contrasts would have triggered the flip flop earlier. Analogously, flip flop 45-2 will be triggered or set when 2 contrast markers have been detected during window $w_2$ and again assuming that the immediately preceding scanning line did not encounter 2 contrast markers during $w2$.

Applying these operational and response aspects to the specific lines, flip flop 45-1 will be triggered at the end of window $w_1$ during scanning line $l_p$ - FIG. 5, or $l_q$ - FIG. 6. Flip flop 45-2 will be triggered at the end of window $w_2$ during scanning line $l_o$ - FIG. 5 or $l_r$ - FIG. 6.

It is now significant that in the case of FIG. 5, flip flop 45-1 is triggered after flip flop 45-2, while in the case of FIG. 6 flip flop 45-1 is triggered before flip flop 45-2.

In each instance, there is a certain period during which only one of the two flip flops is set and not the other. That period is used for counting scanning lines so as to meter the number of lines from $l_o$ to $l_p$ or $l_q$ to $l_r$. Which one of the flip flops is set first determines the direction of the tilt angle and distinguishes the case of FIG. 5 from that of FIG. 6.

For purposes of counting scanning lines, fly back pulses of the line scan are used as identifiers. These pulses are derived from ramps 30 and are prepared as follows: The two flip flops 45-1 and 45-2 control a gating structure 46, which provides a trigger pulse as soon as both of the flip flops 45 have been set, so as to reset a control flip flop 47. Flip flop 47 is set on frame fly back, i.e., in the beginning of a new frame. Flip flop 47 when set enables a gate 49. Gate 49 receives additionally the fly back pulses from the ramps in 30, which provide the line scan. As stated above, these pulses serve as pulses for identifying scanning lines for counting. Th first pulse here is produced at the beginning of that particular frame or field; the last pulse is provided just before both flip flops 45 are set. This then renders line identifying pulses available for counting from the beginning of a field up to, say, line $l_p$ (FIG. 5) or $l_r$ (FIG. 6), when counting has been completed as will be seen shortly In addition, the outputs of flip flops 45-1 and 45-2 are fed to gating structures 48-1 and 48-2 operating on basis of selective EXCLUSIVE OR as far as the states of flip flops 45 are concerned. Gate 48-1 is enabled only when flip flop 45-1 is set while flip flop 45-2 is (still) reset). Gate 48-2 is enabled only when flip flop 45-2 is set while flip flop 45-1 is (still) reset. Gates 48-1 and 48-2 are disabled when both flip flops 45 are set or both are reset.

The two gates 48 receive additionally the gate line count pulses from 49 and gate 48-1 applies these pulses to a counter 53 while gate 48-2 applies these pulses to a counter 50. Only one gate, 48-1 or 48-2, can be enabled at a time. It can readily be seen that gate 48-1 is operated for applying line count pulses to counter 53 when flip flop 45-1 was set before flip flop 45-2 and that occurs in the situation of FIG. 6, because flip flop 45-1 sets before 45-2 when onset of marker signals is detected during a window $w_1$, and marker signals during window $w_2$ occur later. Gate 48-2 is operated for applying line count pulses to counter 50 when flip flop 45-2 was set before flip flop 45-1 and that occurs when onset of marker signals occurs during a window $w_2$ and before such onset is observed during a window $w_1$ (FIG. 5).

It shall be assumed at first, that the situation of FIG. 5 is being observed in which case flip flop 45-2 has been set before flip flop 45-1 is being set. Accordingly, gate 48-2 is enabled and counter 50 counts the number of lines between $l_o$ and $l_p$. During $l_p$ flip flop 45-1 will be set and counting ceases. At that point in time counter 50 holds as a count result to number of lines from $l_o$ to $l_p$, and the fact that counter 50 holds that number and NOT counter 53 is indicative of the fact that misalignment of the scanning lines is on an up slope (FIG. 5) and not a down slope as shown in FIG. 6.

The output of counter 50 is a digital count number which is fed to a digital-to-analog converter 51, feeding one input of a differential amplifier 55. The other (opposite) input of that amplifier receives an analog signal from a second D-to-A converter 53, which, in turn, receives a digital input from a counter 52 to be introduced shortly. Presently, a zero signal is applied to that second input of differential amplifier 55, and a voltage of particular polarity is derivable therefrom. That voltage, called e.g. $\Delta n$), is proportional to the number of lines that were counted (e.g. $\Delta n$) as described and as was outlined above; that number represents the angle of misalignment. The polarity of the output voltage of differential amplifier 55 represents the direction of the misalignment angle, i.e., presently it represents the fact that there is an up-slope of the read raster lines. That fact, in turn, was detected upon detecting that signal BE occurred before signal BF, which, in turn, caused flip flop 46 to set and inhibited flip flop 47.

The signal Δn is now added to the signal Δx which is fed to the read ramps 30 so as to correct the orientation of the read raster. The next raster will have proper orientation. The counter 50 will retain its content so that differential amplifier 55 provides this correction signal until, e.g., reading is completed. During reading, the output signal "read" of the contrast automatic 25 is fed to the read and decoding circuit (now shown) for extracting the data from the resulting signal train. That decoding circuit may be disabled in the read raster mode for the duration of the first raster, as the video output is used during the read raster correction phase for purposes of correction of raster orientation as described.

If the read raster correction phase produced indication of an incorrect read raster with a down-slope, flip flop 45-1 will set before flip flop 45-2. As shown in FIG. 6, there will be a line $l_q$ which traverses the bottom portion of the first two characters and clears the rest. That particularly phased onset of excursions causes monostable multi-vibrator 40 to respond first, causing flip flop 45-1 to set and enabling gate 48-1 until flip flop 45-2 sets during $l_r$. As long as gate 48-1 is enabled, counter 53 counts lines by counting line flyback pulses. That counting proceeds until a line (such as $l_r$) traverses two character markings during a period of signal $w2$, whereupon counting stops. The state of counter 53 is D-to-A converted in 54 and a signal $\Delta m$ is applied to the other input of differential amplifier 55. The resulting output has opposite polarity as compared with the up-slant example above. That output which would be arbitrarily termed - $\Delta m$ is correspondingly added to $\Delta x$ and applied therewith to the reading ramps for realigning the read ramp, i.e., for correcting and eliminating the down-slope.

The invention was explained on basis of a first example constituting the preferred embodiment of the invention as actually practiced. However, other possibilities exist to obtain similar results in principle. First of all, the read raster could run in down-direction in which case one will reasonably use the upper boundary of the upper character row and data area. One could in either case use also one of the boundaries of the white space between the character rows. The advantage here would be that the PISAC lines could be shorter.

The examples above could be termed the section-method, because gating windows are generated in particular phase relation to each scanning line, and the circuit determines whether or not a scanning line traverses, e.g., the data area bottom boundary in one or the other section, and the line counting process yields the information on the misalignment. The example to be explained next uses the precession of the information-noinformation boundary along sequential scanning lines or lines spaced-apart by a fixed distance.

Figure 7:
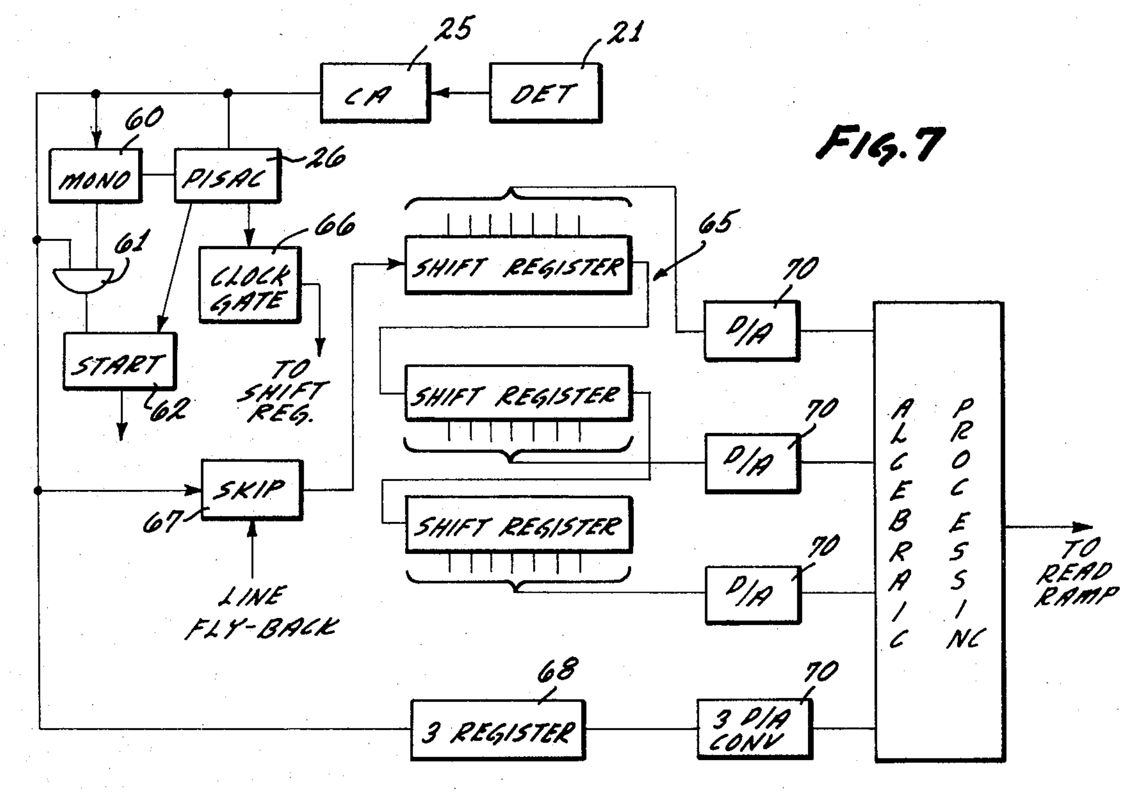
FIG. 7 is a block diagram of another example for practicing the invention.

For explaining this example, it is assumed that the white space between two data row areas and its boundaries are used (FIGS. 1 and 3). The circuit of FIG. 7 shows only the detector 21, the contrast automatic 25, and the PISAC detector 26. The vidicon control ramp generator, the A-B locator circuit, search mode control and read-out logic are all the same as in FIG. 2. The read scan is also presumed to sweep up.

Figures 8A, 9A:
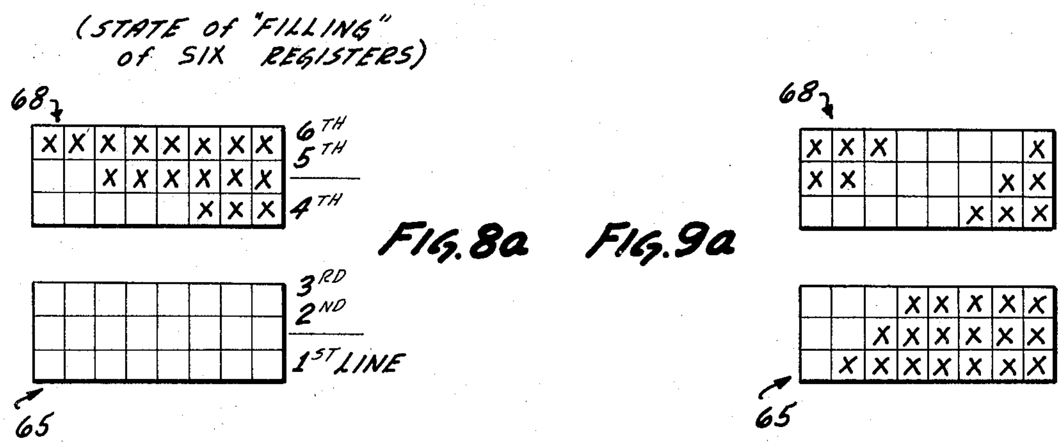
FIGS. 8*a*, 8*b*, 9*a*, 9*b*, are schematics, visual aids for explaining the operation of the system of FIG. 7.
Figure 8B:
Figure 9B:
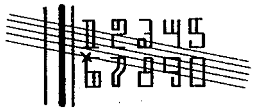

Turning briefly to FIGS. 8*b* and 9*b*, these Figures show respectively a slant-up and slant-down misalignement of the raster field lines. The corrective process is to begin when a scanning line passes near the upper left-hand corner of the lower character row as identified by point Q. Therefore, the circuit is designed to first detect that point Q.

Beginning with a fixed delay in the raster field, each detected PISAC triggers a monostable multi-vibrator 60 opening temporarily a gate 61 for a duration long enough to monitor whether the scanning line sweeps over the first character in the bottom row. If it does (as indicated by a contrast signal from CA-25 during the window), a start circuit 62 is inhibited. Only after a scanning line is high enough in the raster field to clear the first character, start circuit 62 is not blocked and that is deemed the equivalent of detecting Q. When circuit 62 is not blocked, the circuit to be described next, is enabled.

With the next line, the video output signals as processed in CA-25 is set into a shift register assembly 65, composed of three cascaded registers. Shifting is under control of a clock gate 66, receiving clock pulses beginning with the PISAC detection and for a duration about equal to the time equivalent needed to sweep across, e.g., five characters (the rows could be longer!). The clock has a frequency sufficiently high so that, for example the content of a scanning line is quantized into $2^8$ bits.

Depending on the width of a scanning line in relation to the width of the data row areas and of the white space between such areas, one will use for processing sequential lines or skip one or two. This is the purpose of the skip logic 67, which may be interposed and controlled by the line scan flyback signal. As will be shown shortly, altogether six lines are used, and the first and the last one of these six lines should be apart only for about the width of the white space between the data rows, or a little more.

The video signal produced during scanning the next line not skipped, is set into register 65 again, i.e., into the first one of the three while the content of the first register is shifted into the second register of assembly 65. The third line processed is again set into the first register while the second register receives the result of the second line used and, the third register receives the video of the first line scan that was used.

There is an analogous set of registers 68 which receive the result of the next three line scans. At the end of this six line processing, the content of registers 65 and 68 are as depicted schematically in FIG. 8*a*, if one assumes that the scanning raster is as misaligned as shown in FIG. 8*b*. The register 65 will be empty and the registers 68 show increasing degrees of filling. FIG. 9*a* shows analogously the state of register filling, if the misalignment runs in the opposite direction, just as shown in FIG. 9*b*.

It can readily be understood that the difference in degree of filling is a direct indication of the slant angle of misalignment. Moreover, whether or not register 65 contains anything is an indication of the direction of the slant. In order to calculate the needed correction voltage, termed $\Delta n$ above, and to be used in the read ramp inputs, each of the registers has its stages connected to a digitial-to-analog converter 70. One may not need here all stages of the registers, only some of them suffice to establish the analog equivalent of the state and degree of filling of each register. An explanation is in order here. The data bits clocked into registers 65, 68, are bi-valued bits but not necessarily bits of any binary words. They represent basically absence or presence of a contrast or dark marking and their interpretation as data markings is the operation of decoding during or after a successfull read operation. However, for the present purpose one can simply interpret a scanning line as if the scanning line runs across a true binary information carrier; in other words, progressive scanning line increments are assigned ascending or descending position values and markings. As the dividing line or data area boundary shifts in phase on sequential scanning lines, the thusly defined binary numbers change, actually they change by orders of magnitude. Upon converting the thusly defined binary number into an analog signal, the relative boundary location can actually be defined.

An algebraic unit 75 simply takes, e.g., the analog equivalents of the three registers 68 when 65 is empty and calculates the angle. The sign is given by the fact that 65 is empty! When 65 is not all empty, unit 75 ignores 68 and calculates an angle from the analog equivalents of the three registers 65. The sign of that angle is given by the fact that 65 is not empty. One can readily see generally that the larger the difference in analog values in either case, the shallower is the misalignment angle.

The same method is, of course, usable for a single row data field using its upper and lower boundary, and processing the precession of the information-noinformation in the storage register of the result of scanning in sequential scanning lines. It should be noted that actually two registers per set would suffice, but redundancy is highly desirable for reasons of accuracy.

Figures 10, 10A, 11A, 11B:
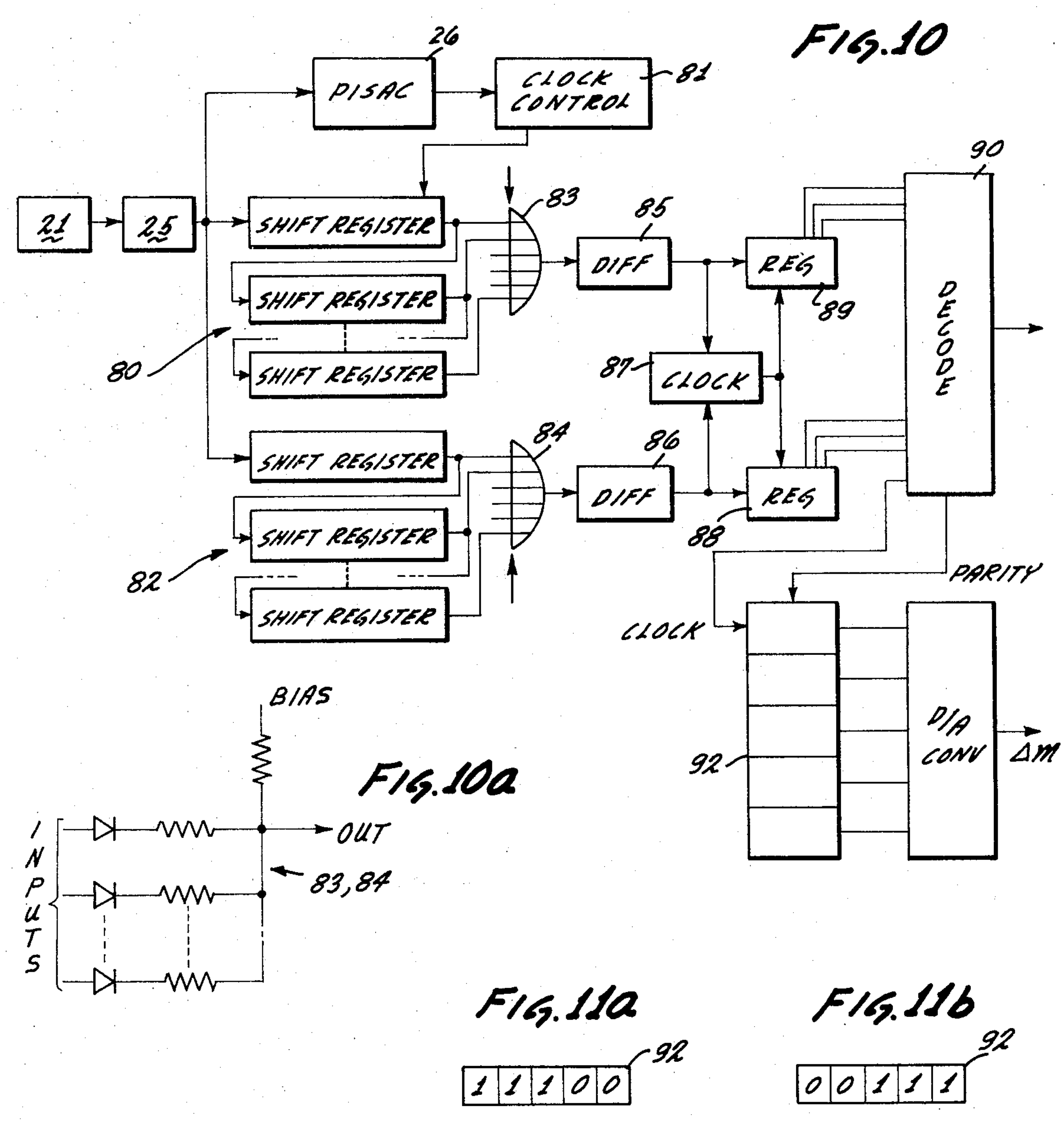
FIG. 10 is a block diagram of another example for practicing the invention.
FIGS. 11, 11*a* and 11*b* are visual aids for explaining the operation of the system of FIG. 10.

FIG. 10 illustrates another example of the invention, whereby FIG. 10 is used additionally to explain the read circuit proper, usable as such for all examples, but used additionally presently for practicing the invention. During regular read, the contrast data from contrast automatic 25 are applied to a set of registers 80, e.g. six shift registers. These shift registers are clocked by a clock control circuit 81 which responds to PISAC detection for each line and commences shift clocking thereat. Each data track (assuming presently a single row data field) is scanned in six fold redundancy by six scanning lines. The six registers are connected, for example, in series, but the number of stages is selected that with the end of a scanning line the first bit that was shifted into a register has arrived at the end thereof, and upon PISAC detection on the next line, that first bit is shifted into the entrance stage of the next register etc.

After skipping over the in-between track space, the data of the other track are set into a second set of six registers 82. Shift clocking begins in each instance with PISAC detection, so that all shift registers receive data in phase synchronism. It should be noted here that the beginning of a data run of each scanning line needs to be accurately defined to obtain the vertical information alignment of different scanning lines as different scanning lines hold information on the same character. The PISAC detection and phasing of the read-out signals in relation thereto is instrumental here in obtaining that result. Following PISAC detection, the video signal in each instance is clocked, e.g. in 256 consecutive bits into the register. The last bit is presumed to occur before the scanning line reaches the label end and/or before the flyback of that line, but after the last character has been traversed. Stopping clocking at a specified instant defines a fixed number of bits for each line, and all have a definite time/space/phase relationship to the passage over PISAC.

After all registers have been loaded in that manner, the twelve registers contain the digitized contrast markings (1) and label background information (0) bits in register position alignment. There are usually several consecutive 1 bits per contrast line as the lines are thicker than the equivalent bit cell width on the label. In case of proper alignment, the *n*'th stage in each of six registers should contain the same bit value, or even in each of all twelve registers if a long vertical marking was traversed in each instance. Now, the content of all registers is clocked out of the registers and in synchronism for all of them, and the content of each register 80 is applied serially to one input of a weighted OR gate 83, which has six inputs and receives the content of the registers 80 in parallel. There is an analogous weighted OR gate 84 for combining the content of registers 83 (see FIG. 10a).

These OR gates operate on basis of the majority principle, and pass a contrast defining bit only when, e.g., more than half of all bits presented concurrently define the contrast level of a marking. The output train of gates 82, 83, are individually differentiated at 85, 86, and the output spikes, representing, for example, the leading edges of a marker, are combined in a clock circuit 86 which, in turn, is used to clock the spikes, as representing marker bits into registers 88, 89. For each character, four marker bits should be received, together with two bits representing absence of a marker, as each character has six possible marker positions, only four being occupied for a legal character.

A circuit 90 decodes these six bits of each character and re-encodes them, for example, as bcd character. For a proper orientation of the raster field, this is the normal read-out circuit operation. However, if the scanning raster is slanted, the situation is different. The decoding and character assembly depends on the condition that the scanning lines do not miss any vertical marking. That is the reason for wanting the raster lines aligned with the tracks to begin with. If, because of that, scanning lines run partially outside of the proper track space, the detector 21 will pick up contrasts when a line traverses, for example, a horizontal top, middle or bottom bar of a character. The result will be in most instances a non-decodable character. This fact can be used to determine misalignment.

Figure 11:
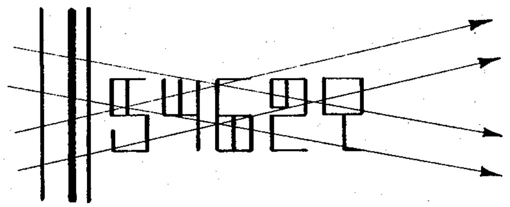

Take the two situations of FIG. 11, wherein the two lines $l_1$ and $l_2$ are two scanning lines, the pair being shown in two different kinds of raster misalignment. One can readily see that in the case of a down slant the first two characters as traversed will not be properly decoded, only the last three will. Conversely, in case of an up-slant as illustrated, only the first three characters will be decoded properly. For a slightly steeper misalignment, it will be only two characters, for a lesser angle, it will be four.

Thus, a register 92 is provided which receives from the decoder 90 character pulses, e.g., a 1 for each undecodable character. The content of the register 92 will look as schematically shown in FIG. 11a in case of an up-slant, or like FIG. 11*b* in case of a down-slant. Again, that digital content can be converted into an analog signal for obtaining an alignment correction signal.

It should be noted then that this acquisition of misalignment information is carried out prior to actual reading, but the system, so to speak, makes an attempt to read the data with the raster as initially established. It may be advisable here not to use the six-fold redundancy of each track, but to use only the content of one register in each of the sets 80 and 82. This can be carried out in that the read raster correction phase enables one input each for the gates 83, 84 by a special phase signal provided for that purpose. One can pair different ones, not necessarily corresponding ones, during several different sequential read raster correction phases, to obtain a number of different readings and different distribution of correctly and incorrectly decoded characters.

The invention is not limited to the embodiments described above but all changes and modifications thereof not constituting departures from the spirit and scope of the invention are intended to be included.

I claim:

1. In a method for preparation for reading information from a data carrier, the information being defined by contrasting data markings arranged on the carrier within a particular area on the carrier bounded by an upper and/or a lower boundary which is not necessarily delineated by a contiguous marking, whereby above the lower or below the upper boundary markings are provided having extension transverse to the boundary, there being space free from markings below the lower and above the upper boundaries, the method including providing a scanning raster defined by a scanning line extending in a first direction and shifting the scanning line in a second direction transverse to the first direction, and providing a video signal in response to scanning by means of the raster, the method further including orienting the scanning raster so that the scanning lines run at least approximately parallel to the boundaries, the improvement comprising:

providing video signal manifestation of passage of the scanning lines across at least one of the boundaries, the passage defined by passage across plural markings as preceded or succeeded by absence of such passage;

providing representation of different phases of such passages in and along the respective scanning lines for different ones of the scanning lines in the same raster field;

selecting a plurality of such lines in association with different phases of these lines to establish a representation of angular misalignment between the direction of the scanning lines and the direction of the boundaries; and correcting the orientation of the raster field in accordance with the latter representation, prior to reading of the data by operation of the corrected raster field.

2. In a method as in claim 1, wherein the data carrier has additionally a characteristic line pattern extending in front of the data markings with respect to the direction of the scanning line, and including processing the video signal for detecting on each scanning line, the line pattern when traversed, the different phases of passages being provided with reference to detection of the line pattern.

3. In a method as in claim 1, wherein the selecting step includes counting the number of lines between a first one that traverses a first section of the one boundary, and a second one that traverses a second section of the one boundary, the first and second sections represented by different phases on a scanning line in relation to the data area.

4. In a method for preparation for reading information from a data carrier, the information being defined by contrasting data markings arranged on the carrier within a particular area on the carrier bounded by an upper and/or a lower boundary which is not necessarily delineated by a contiguous marking, whereby above the lower or below the upper boundary, markings are provided having extension transverse to the boundary, there being space free from markings below the lower and above the upper boundaries, the method including providing a scanning raster defined by a scanning line extending in a first direction and shifting the scanning line in a second direction transverse to the first direction, and providing a video signal in response to scanning by means of the raster, the method further including orienting the scanning raster so that the scanning lines run at least approximately parallel to the boundaries, the improvement comprising:

detecting for each of two different, sequential scanning lines, the relative phase of video signal train portions of uniform amplitude and the onset or the tail end of train portions with plural sequential signal excursions as representing passage of scanning across plural contrasting markings;

calculating representation of a misalignment angle from the spacing between the two lines and the difference in the said respective phases; and correcting the read raster orientation on basis of the calculated representation.

5. Method as in claim 4, wherein the number of lines between the two different lines is fixed.

6. Method as in claim 4, wherein the phases are fixed and the number of lines between the two different lines is ascertained for said calculation.

7. In a method for preparation for reading information from a data carrier, the information being defined by contrasting markings arranged on the carrier within a particular area on the carrier bounded by an upper and/or a lower boundary which is not necessarily delineated by a contiguous marking, whereby above the lower or below the upper boundary, markings are provided having extension transverse to the boundary, there being space free from markings below the lower and above the upper boundaries, the method including providing a scanning raster defined by a scanning line extending in a first direction and shifting the scanning line in a second direction transverse to the first direction, and providing a video signal in response to scanning by means of the raster, the method further including orienting the scanning raster so that the scanning lines run at least approximately parallel to the boundaries, the improvement comprising:

storing digitized representation of the video signal separately for a plurality of the scanning lines which have obliquely crossed one of the boundaries; distinguishing between passage across space free from markings and space occupied by markings;

providing analog representation of the signal to obtain analog signals, separate for each such line, and of the relative length of the portion of the respective scanning line that passed across markings and the marking field;

processing the analog signals to obtain a representation of the angular misalignment between the scanning raster lines and of the direction of the one boundary; and correcting the raster field on basis of the representation, prior to reading of the data by operation of the corrected raster field.

8. In a method for preparation for reading information from a data carrier, the information being defined by contrasting markings arranged on the carrier within a particular area on the carrier bounded by an upper and/or a lower boundary which is not necessarily delineated by a contiguous marking, whereby above the lower or below the upper boundary, markings are provided having extension transverse to the boundary, there being space free from markings below the lower and above the upper boundaries, the method including providing a scanning raster defined by a scanning line extending in a first direction and shifting the scanning line in a second direction transverse to the first direction, and providing a video signal in response to scanning by means of the raster, the method further including orienting the scanning raster so that the scanning lines run at least approximately parallel to the boundaries, the improvement comprising:

providing a line pattern having extension transverse to the boundaries and located to one side of the data as between the boundaries and extending above and below the boundaries;

detecting the passage of each scanning line across the line pattern, when passing across the scanning line;

generating a first and a second window as phase sections for each scanning line, and having a fixed phase relation to the detection of passage of the scanning line across the line pattern, the first window being relatively early, the second window being relatively late with reference to the instant of detection of the line pattern;

determining two scanning lines in the raster which pass across one of the boundaries when the boundary is respectively traversed upon occurrence of the first and second window, the determining including differentiation between passage of scanning lines across marker free space and passage across at least two markings in the particular area;

determining by how many scanning lines in the raster these two determined scanning lines are apart; and correcting the angular orientation of the raster on the basis of the second determining step prior to reading of the data by operation of the corrected raster field.

9. In a method for preparation for reading information from a data carrier, the information being defined by contrasting markings arranged on the carrier within a particular area on the carrier bounded by an upper and/or a lower boundary which is not necessarily delineated by a contiguous marking, whereby above the lower or below the upper boundary, markings are provided having extension transverse to the boundary, there being space free from markings below the lower and above the upper boundaries, the method including providing a scanning raster defined by a scanning line extending in a first direction and shifting the scanning line in a second direction transverse to the first direction, and providing a video signal in response to scanning by means of the raster, the method further including orienting the scanning raster so that the scanning lines run at least approximately parallel to the boundaries, the markings defining individual characters, each character being defined by a code having particular format to distinguish between legal and illegal characters; the improvement comprising:

providing a particular line pattern transverse to the boundaries and not being a legal character;

processing the video signal as provided during each one of sequential line scans in each instance following a traversal of the line pattern by the respective scanning lines, including determining whether the markings traversed define legal or illegal characters;

determining the number of illegal characters as following directly detection of the line pattern or as following a number of legal characters, towards the end of the data field in representation of angular misalignments of the raster field; and correcting the orientation of the angular alignment on basis of the representation so that all characters traversed are legal during the next attempt to read the data.

* * * * *